United States Patent
Kajisawa et al.

(10) Patent No.: US 12,409,880 B2
(45) Date of Patent: Sep. 9, 2025

(54) STEERING SYSTEM

(71) Applicant: JTEKT CORPORATION, Kariya (JP)

(72) Inventors: Yuuta Kajisawa, Okazaki (JP); Yuji Fujita, Okazaki (JP); Kenichi Abe, Okazaki (JP); Toshihiro Takahashi, Okazaki (JP); Toshiaki Oya, Sakai (JP); Yoshinobu Shimizu, Sakai (JP); Masahiko Sakamaki, Yao (JP); Shintaro Takayama, Toyota (JP); Yosuke Yamashita, Toyota (JP); Masaharu Yamashita, Nagoya (JP)

(73) Assignee: JTEKT CORPORATION, Kariya (JP)

( * ) Notice: Subject to any disclaimer, the term of this patent is extended or adjusted under 35 U.S.C. 154(b) by 618 days.

(21) Appl. No.: 17/868,529

(22) Filed: Jul. 19, 2022

(65) Prior Publication Data
US 2023/0026250 A1    Jan. 26, 2023

(30) Foreign Application Priority Data
Jul. 21, 2021   (JP) .................. 2021-120721

(51) Int. Cl.
*B62D 5/00* (2006.01)
*B60R 25/021* (2013.01)
(Continued)

(52) U.S. Cl.
CPC ........ *B62D 5/006* (2013.01); *B60R 25/02142* (2013.01); *B60R 25/0215* (2013.01); *B62D 5/003* (2013.01); *B62D 5/046* (2013.01)

(58) Field of Classification Search
CPC .......... B62D 5/003; B62D 5/006; B62D 5/30; B62D 6/008; B60R 25/02; B60R 25/0215
See application file for complete search history.

(56) References Cited

U.S. PATENT DOCUMENTS

2020/0277003 A1*  9/2020  Horváth ................ B62D 5/005
2020/0406954 A1* 12/2020  Szepessy .............. B62D 6/008
(Continued)

FOREIGN PATENT DOCUMENTS

DE         100 53 335 A1     5/2002
DE    10 2018 114 988 A1    12/2019
(Continued)

OTHER PUBLICATIONS

Dec. 13, 2022 Extended European Search Report issued in Patent Application No. 22185960.6.

*Primary Examiner* — Christopher B Wehrly
(74) *Attorney, Agent, or Firm* — Oliff PLC

(57) ABSTRACT

A steering system is configured such that electric power is supplied to a steering actuator and a turning actuator from a first power supply when a power state of a vehicle is an on state and supply of the electric power from the first power supply is cut off when the power state is an off state. The steering system includes a rotation curbing unit configured to operate such that rotation of the steering wheel is curbed in at least a part of a first power-off period from when the power state becomes an off state until when the power state becomes the on state next, as an operating period, and a second power supply configured to supply, to the rotation curbing unit, the electric power required for operation of the rotation curbing unit in the operating period, the second power supply being different from the first power supply.

5 Claims, 7 Drawing Sheets

(51) Int. Cl.
   *B60R 25/0215*   (2013.01)
   *B62D 5/04*   (2006.01)

(56) References Cited

U.S. PATENT DOCUMENTS

| | | | |
|---|---|---|---|
| 2021/0253157 A1 | 8/2021 | Hamori et al. | |
| 2023/0009437 A1* | 1/2023 | Ko | B62D 5/046 |
| 2023/0012253 A1* | 1/2023 | Lee | B62D 6/008 |

FOREIGN PATENT DOCUMENTS

| | | |
|---|---|---|
| JP | 2020-011646 A | 1/2020 |
| WO | 2019/179859 A1 | 9/2019 |

* cited by examiner

POWER SUPPLY MODE

| SW | AUXILIARY POWER SUPPLY CONTROL UNIT | STEERING-SIDE CONTROL UNIT | TURNING-SIDE CONTROL UNIT |
|---|---|---|---|
| ON (MAIN POWER SUPPLY or AUXILIARY POWER SUPPLY) | SUPPLY | SUPPLY | SUPPLY |
| OFF (AUXILIARY POWER SUPPLY) | SUPPLY | SUPPLY | CUTOFF |

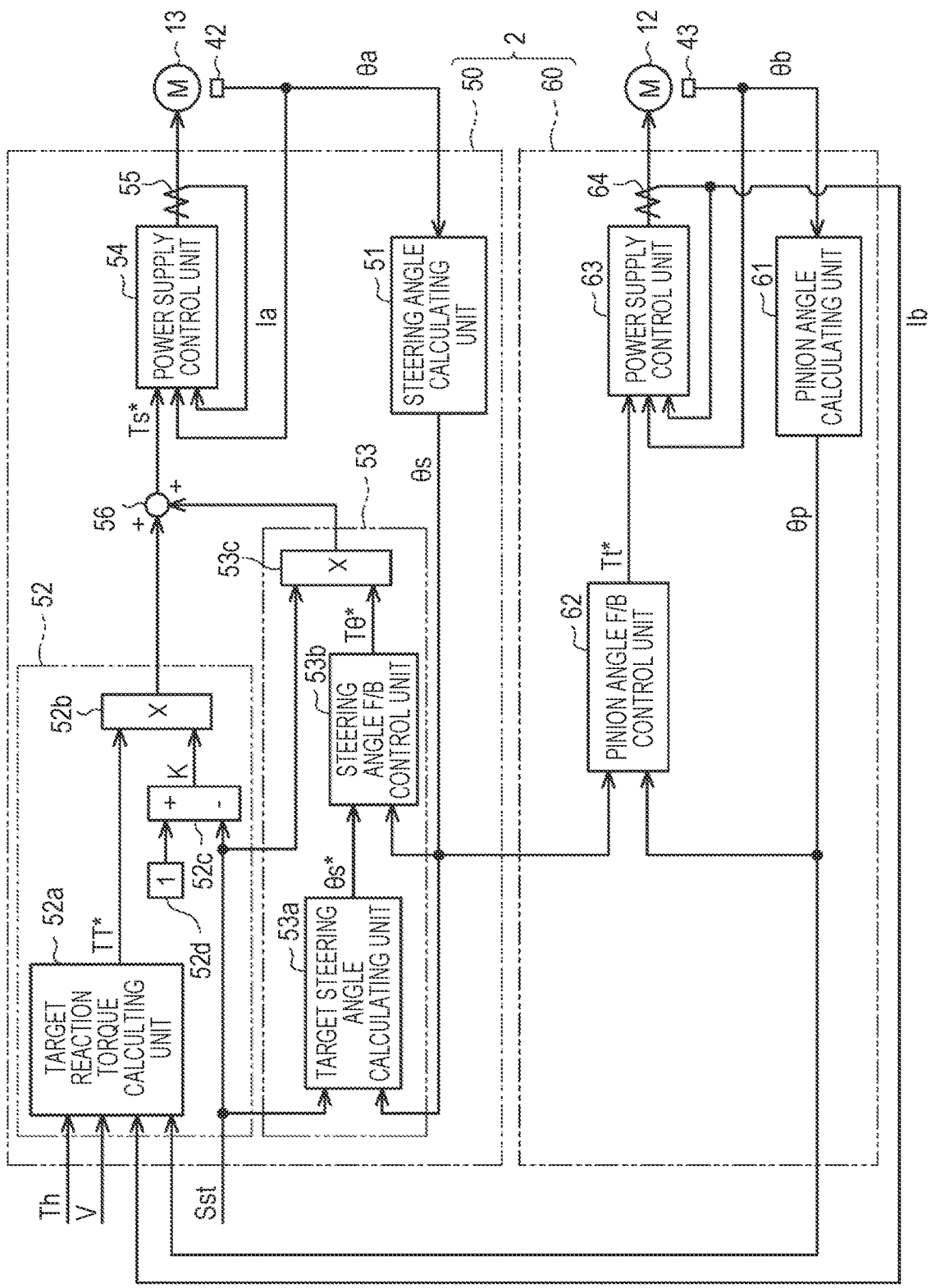

FIG. 7

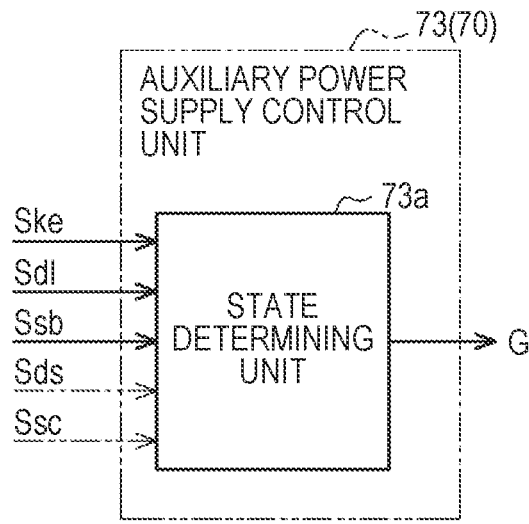

FIG. 8

POWER SUPPLY MODE

| SW | OCCUPANT STATE GAIN | AUXILIARY POWER SUPPLY CONTROL UNIT | STEERING-SIDE CONTROL UNIT | TURNING-SIDE CONTROL UNIT |
|---|---|---|---|---|
| ON (MAIN POWER SUPPLY or AUXILIARY POWER SUPPLY) | 1 | SUPPLY | SUPPLY | SUPPLY |
| ON (MAIN POWER SUPPLY or AUXILIARY POWER SUPPLY) | 0 | SUPPLY | SUPPLY | SUPPLY |
| OFF (AUXILIARY POWER SUPPLY) | 1 | SUPPLY | SUPPLY | CUTOFF |
| OFF (AUXILIARY POWER SUPPLY) | 0 | SUPPLY | CUTOFF | CUTOFF |

STEERING SYSTEM

CROSS-REFERENCE TO RELATED APPLICATION

This application claims priority to Japanese Patent Application No. 2021-120721 filed on Jul. 21, 2021, incorporated herein by reference in its entirety.

BACKGROUND

1. Technical Field

The disclosure relates to a steering system.

2. Description of Related Art

For example, a steering system including a steering unit that operates to apply a steering reaction force to a steering wheel of a vehicle and a turning unit that operates to turn turning wheels of the vehicle is mounted in a vehicle. Japanese Unexamined Patent Application Publication No. 2020-11646 (JP 2020-11646 A) discloses a steer-by-wire steering system having a structure in which a power transmission path between a steering unit and a turning unit is cut off as an example.

In JP 2020-11646 A, an angle difference between an angle of a steering wheel and an angle of turning wheels can be decreased even when an ignition switch indicating a power state of a vehicle is in an off state. Specifically, a steering lock device that locks a rotational operation of the steering wheel is attached to a column shaft of the steering unit. The steering lock device is configured to operate such that the rotational operation of the steering wheel is locked after the ignition switch is brought to the off state.

SUMMARY

The steering lock device in JP 2020-11646 A operates after the ignition switch is brought to the off state. In this case, in order that a power supply of the vehicle can supply electric power normally when the ignition switch is turned on next, electric power required for operation of the steering lock device needs to be appropriately secured even when the ignition switch is in the off state.

According to an aspect of the disclosure, there is provided a steering system including a steering actuator configured to operate such that a steering reaction force is applied to a steering wheel of a vehicle, using electric power supplied from a first power supply mounted in the vehicle; and a turning actuator having a structure in which a power transmission path between the turning actuator and the steering actuator is cut off, the turning actuator being configured to operate such that turning wheels of the vehicle are turned, using the electric power supplied from the first power supply. The steering system is configured such that the electric power is supplied to the steering actuator and the turning actuator from the first power supply when a power state of the vehicle is an on state and supply of the electric power from the first power supply is cut off when the power state is an off state. The steering system further includes a rotation curbing unit configured to operate such that rotation of the steering wheel is curbed in at least a part of a first power-off period from when the power state becomes the off state until when the power state becomes the on state next, as an operating period, and a second power supply configured to supply, to the rotation curbing unit, the electric power required for operation of the rotation curbing unit in the operating period, the second power supply being different from the first power supply.

With this configuration, in the operating period which is at least a part of the first power-off period in which the electric power from the first power supply is cut off, the electric power required for the operation of the rotation curbing unit is supplied from the second power supply. That is, when the rotation curbing unit operates in the operating period, the electric power does not need to be supplied from the first power supply. Accordingly, in the first power-off period, it is possible to curb consumption of the electric power in the first power supply even when the rotation curbing unit operates. In this case, it is possible to appropriately secure the electric power required for the operation of the rotation curbing unit when the vehicle is powered off, in order that the first power supply of the vehicle can supply the electric power normally when the vehicle is powered on next.

In the steering system, the operating period may coincide with the first power-off period in regard to a state of the vehicle. With this configuration, it is possible to appropriately curb an angle difference between an angle of the steering wheel and an angle of the turning wheels.

In the steering system, the operating period may be a period in which a driver is located within a predetermined distance from the vehicle in the first power-off period in regard to states of the driver and the vehicle. The rotation curbing unit may be configured to operate in the period in which the driver is within the predetermined distance from the vehicle, as the operating period, while the power state is the off state.

For example, in the first power-off period, the possibility that the driver may contact the steering wheel is high when the driver is located near the vehicle. In this regard, with this configuration, the rotation curbing unit can be caused to operate in a situation in which the driver is away from the vehicle and the possibility that the driver may contact the steering wheel is high. In this case, a period in which the rotation curbing unit operates, that is, the operating period, can be set to be shorter than the first power-off period. This is effective for curbing consumption of the electric power in the second power supply.

The steering system may further include an electronic control unit configured to determine the state of the driver. The electronic control unit may be configured to determine the state of the driver based on at least one of i) a key position of a vehicle key for permitting use of the vehicle with respect to the vehicle, ii) the key position and a lock state of a vehicle door that is opened and closed when the driver boards the vehicle and when the driver alights from the vehicle, and iii) the key position and an open-closed state of the vehicle door.

With this configuration, based on the key position, it is possible to determine whether the driver is in the vehicle and to determine a likelihood of contact of the driver with the steering wheel. Based on the key position and the lock state of the vehicle door, it is possible to more accurately determine whether the driver is in the vehicle and to more accurately determine a likelihood of contact of the driver with the steering wheel. This is the same as in a case based on the key position and the open-closed state of the vehicle door. Accordingly, the electronic control unit can appropriately determine the state of the driver indicating whether the driver is away from or located near the vehicle.

In the steering system, the steering actuator may include a reaction motor configured to generate a motor torque serving as power for applying the steering reaction force to the steering wheel, and the rotation curbing unit may be the reaction motor.

When the reaction motor is employed as the rotation curbing unit as in this configuration, the electric power needs to be supplied to at least the steering actuator such that the steering actuator can operate in the operating period in the first power-off period. In this regard, with the configuration, it is possible to realize the supply of the electric power to the steering actuator in a state in which a load on the first power supply is curbed in the first power-off period. Accordingly, with the configuration in which the reaction motor is employed as the rotation curbing unit, it is possible to appropriately secure the electric power required for the operation of the reaction motor when the vehicle is powered off, in order that the first power supply of the vehicle can supply the electric power normally when the ignition switch is turned on next. In this case, it is not necessary to employ a mechanical structure with relatively low power consumption as the rotation curbing unit. This is effective for realizing a decrease in size, simplification of the configuration, a decrease in manufacturing cost, and the like for the steering system, particularly, the steering actuator.

In the steering system, the second power supply may be configured to back up supply of the electric power to the steering actuator and the turning actuator instead of the first power supply, on condition that the electric power supplied by the first power supply is decreased or cut off while the power state is the on state.

With this configuration, for example, when the steering system includes a backup power supply that backs up the supply of the electric power to the steering actuator and the turning actuator instead of the first power supply, the backup power supply can be used as the second power supply. In this case, it is possible to decrease the extent of modification for adding the configuration of the second power supply to the steering system.

With the steering system according to the aspect of the disclosure, it is possible to appropriately secure the electric power required for the operation of the rotation curbing unit even when the power state of the vehicle is the off state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a block diagram illustrating functions of a steering control device according to the first embodiment;

FIG. 7 is a block diagram illustrating functions of an auxiliary power supply control unit of an auxiliary power supply device according to a second embodiment;

FIG. 8 is a diagram illustrating a power supply mode according to the second embodiment;

DETAILED DESCRIPTION OF EMBODIMENTS

First Embodiment

Figure 1:
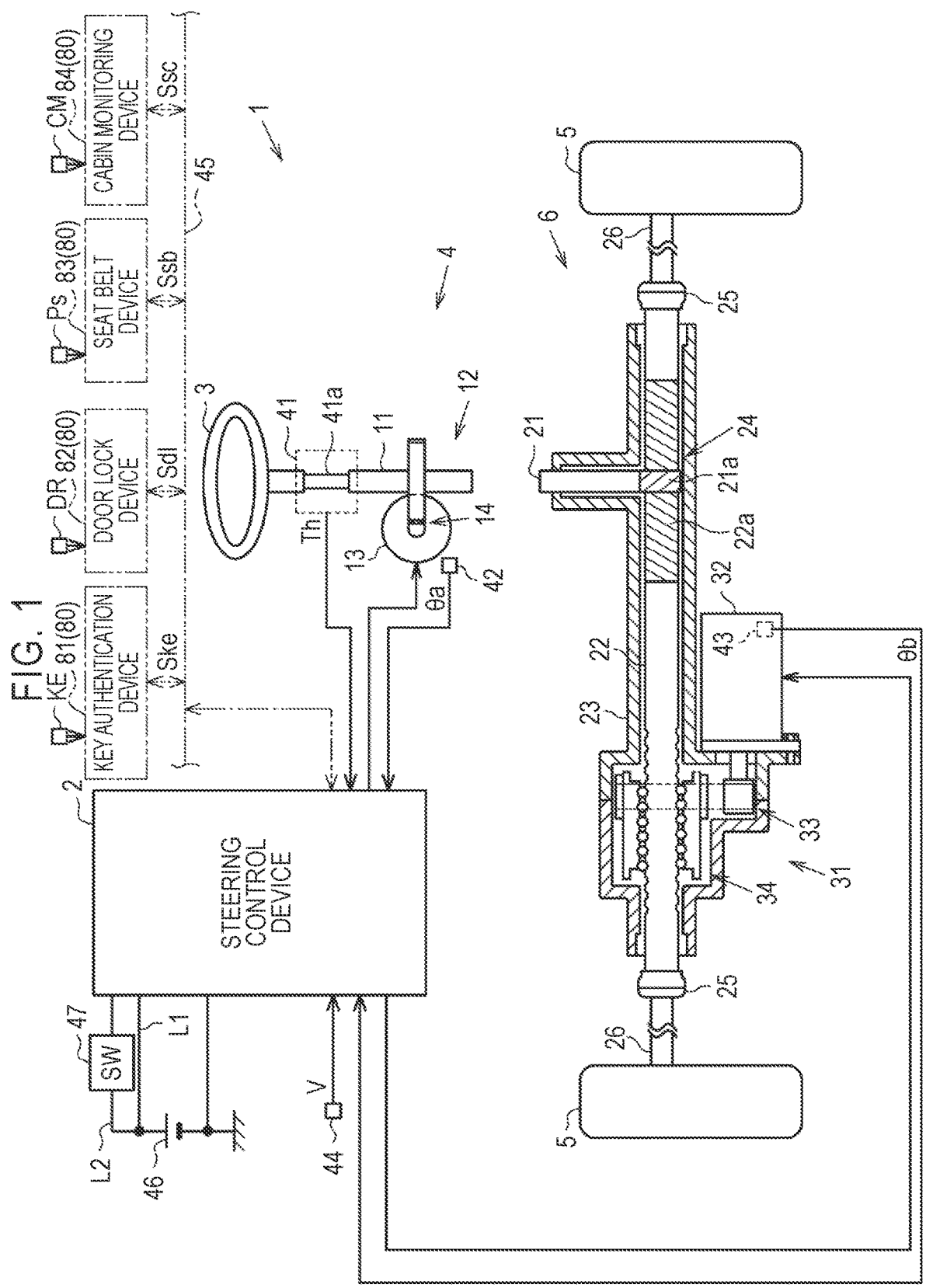
FIG. 1 is a diagram schematically illustrating a configuration of a steer-by-wire steering system according to a first embodiment.

Hereinafter, a steering system according to a first embodiment of the disclosure will be described with reference to the accompanying drawings. As illustrated in FIG. 1, a steering system 1 according to this embodiment is a steer-by-wire vehicle steering system. The steering system 1 includes a steering control device 2 that controls operation of the steering system 1. The steering system 1 includes a steering unit 4 and a turning unit 6. The steering unit 4 is steered by a driver via a steering wheel 3 of a vehicle. The turning unit 6 turns right and left turning wheels 5 of the vehicle in accordance with steering input to the steering unit 4 by the driver. The steering system 1 according to this embodiment has a structure in which a power transmission path between the steering unit 4 and the turning unit 6 is normally mechanically cut off. That is, a power transmission path between a steering actuator 12 which will be described later and a turning actuator 31 which will be described later is normally mechanically cut off.

The steering unit 4 includes a steering shaft 11 and a steering actuator 12. The steering shaft 11 is connected to the steering wheel 3. The steering actuator 12 includes a steering-side motor 13 which is a drive source and a steering-side speed reduction mechanism 14. The steering-side motor 13 is a reaction motor that applies a steering reaction force which is a force against steering, to the steering wheel 3 via the steering shaft 11. The steering-side motor 13 is connected to the steering shaft 11, for example, via the steering-side speed reduction mechanism 14 formed of a worm and wheel. For example, a three-phase brushless motor is employed as the steering-side motor 13 according to this embodiment.

The turning unit 6 includes a pinion shaft 21, a rack shaft 22 that is a turning shaft, and a rack housing 23. The pinion shaft 21 and the rack shaft 22 are connected with a predetermined crossing angle. A rack and pinion mechanism 24 is constituted by causing pinion teeth 21a formed in the pinion shaft 21 and rack teeth 22a formed in the rack shaft 22 to engage with each other. That is, the pinion shaft 21 corresponds to a rotation shaft of which a rotation angle can be converted to a turning angle of the turning wheels 5. The rack housing 23 accommodates the rack and pinion mechanism 24. One end of the pinion shaft 21 opposite to an end connected to the rack shaft 22 protrudes from the rack housing 23. Both ends of the rack shaft 22 respectively protrude from both ends in an axial direction of the rack housing 23. Tie rods 26 are respectively connected to both ends of the rack shaft 22 via rack ends 25 each of which is formed of a ball joint. The distal ends of the tie rods 26 are connected to knuckles (not illustrated) to which the right and left turning wheels 5 are assembled.

The turning unit 6 includes a turning actuator 31. The turning actuator 31 includes a turning-side motor 32 which is a drive source, a transmission mechanism 33, and a conversion mechanism 34. The turning-side motor 32 applies a turning force for turning the turning wheels 5 to the rack shaft 22 via the transmission mechanism 33 and the conversion mechanism 34. The turning-side motor 32 transmits rotation to the conversion mechanism 34, for example, via the transmission mechanism 33 formed of a belt transmission mechanism. The transmission mechanism 33 converts the rotation of the turning-side motor 32 to reciprocating movement of the rack shaft 22, for example, via the conversion mechanism 34 formed of a ball screw mechanism. For example, a three-phase brushless motor is employed as the turning-side motor 32 according to this embodiment.

In the steering system 1 having the aforementioned configuration, a turning angle of the turning wheels 5 is changed by applying a motor torque as the turning force from the turning actuator 31 to the rack shaft 22 according to a driver's steering operation. At this time, a steering reaction force against the driver's steering is applied to the steering wheel 3 from the steering actuator 12. That is, in the steering system 1, a steering torque Th required for steering of the steering wheel 3 is changed by the steering reaction force which is the motor torque applied from the steering actuator 12.

The reason why the pinion shaft 21 is provided is that the rack shaft 22 is supported together with the pinion shaft 21 in the rack housing 23. That is, by a support mechanism (not illustrated) which is provided in the steering system 1, the rack shaft 22 is supported to be movable in an axial direction thereof and is pressed toward the pinion shaft 21. Accordingly, the rack shaft 22 is supported in the rack housing 23. Another support mechanism that supports the rack shaft 22 in the rack housing 23 without using the pinion shaft 21 may be provided.

Electrical Configuration of Steering System 1

As illustrated in FIG. 1, the steering-side motor 13 and the turning-side motor 32 are connected to the steering control device 2. The steering control device 2 controls operations of the steering-side motor 13 and the turning-side motor 32.

A torque sensor 41, a steering-side rotation angle sensor 42, a turning-side rotation angle sensor 43, and a vehicle speed sensor 44 are connected to the steering control device 2. The torque sensor 41 detects a steering torque Th which is a value indicating a torque applied to the steering shaft 11 according to a driver's steering operation. The torque sensor 41 is provided in a part of the steering shaft 11, the part being closer to the steering wheel 3 than the steering-side speed reduction mechanism 14 is. The torque sensor 41 detects the steering torque Th based on an amount of torsion of a torsion bar 41a provided at a position in the steering shaft 11. For example, the steering torque Th is detected as a positive value when steering to the right is performed and is detected as a negative value when steering to the left is performed.

The steering-side rotation angle sensor 42 detects a rotation angle θa which is an angle of a rotation shaft of the steering-side motor 13 in a range of 360°. The steering-side rotation angle sensor 42 is provided in the steering-side motor 13. The rotation angle θa of the steering-side motor 13 is used to calculate a steering angle θs. The steering-side motor 13 and the steering shaft 11 operate in conjunction with each other via the steering-side speed reduction mechanism 14. Accordingly, there is a correlation between the rotation angle θa of the steering-side motor 13 and a rotation angle of the steering shaft 11, and thus, there is a correlation between the rotation angle θa of the steering-side motor 13 and the steering angle θs which is a rotation angle of the steering wheel 3. Accordingly, the steering angle θs can be calculated based on the rotation angle θa of the steering-side motor 13. For example, the rotation angle θa is detected as a positive value when steering to the right is performed and is detected as a negative value when steering to the left is performed.

The turning-side rotation angle sensor 43 detects a rotation angle θb which is an angle of a rotation shaft of the turning-side motor 32 in a range of 360°. The turning-side rotation angle sensor 43 is provided in the turning-side motor 32. The rotation angle θb of the turning-side motor 32 is used to calculate a pinion angle θp. The turning-side motor 32 and the pinion shaft 21 operate in conjunction with each other via the transmission mechanism 33, the conversion mechanism 34, and the rack and pinion mechanism 24. Accordingly, there is a correlation between the rotation angle θb of the turning-side motor 32 and the pinion angle θp which is a rotation angle of the pinion shaft 21. Accordingly, the pinion angle θp can be calculated based on the rotation angle θb of the turning-side motor 32. The pinion shaft 21 engages with the rack shaft 22. Accordingly, there is also a correlation between the pinion angle θp and an amount of movement of the rack shaft 22. That is, the pinion angle θp is a value in which the turning angle of the turning wheels 5 is reflected. For example, the rotation angle θb is detected as a positive value when steering to the right is performed and is detected as a negative value when steering to the left is performed.

The vehicle speed sensor 44 detects a vehicle speed V which is set as information indicating a travel speed of the vehicle. The vehicle speed sensor 44 may be connected to a vehicle-side control device which is mounted in the vehicle as a control device other than the steering control device 2. In this case, the vehicle speed V is input to the steering control device 2 from the vehicle-side control device via an onboard network 45 such as a CAN indicated by an alternate long and two short dashes line in FIG. 1.

A main power supply 46 is connected to the steering control device 2, that is, the steering system 1. The main power supply 46 is a secondary battery mounted in the vehicle, serves as a power source of electric power supplied to the motors 13 and 32 such that they operate, and serves as a power source of electric power supplied to the steering control device 2, that is, the steering system 1, such that it operates. In this embodiment, the main power supply 46 is an example of a first power supply.

A start switch 47 of the vehicle (indicated by "SW" in FIG. 1) such as an ignition switch is provided between the steering control device 2 and the main power supply 46. The start switch 47 is provided at a position in a power supply line L2 branching from a power supply line L1 out of two power supply lines L1 and L2 connecting the steering control device 2 and the main power supply 46. The start switch 47 is operated when various functions are started such that the vehicle can operate by operating a traveling drive source of the vehicle such as an engine. The power supply line L2 is turned on and off through operation of the start switch 47. In this embodiment, an operating state of the steering system 1 is correlated with an operating state of the vehicle. The power supply line L1 is basically normally turned on, and the power supply line L1 is indirectly turned on and off as a function of the steering system 1 according to the operating state of the steering system 1. That is, the operating state of the steering system 1 is correlated with on and off states of the power supply lines L1 and L2 which are power supply states of the main power supply 46.

Figures 2, 3:
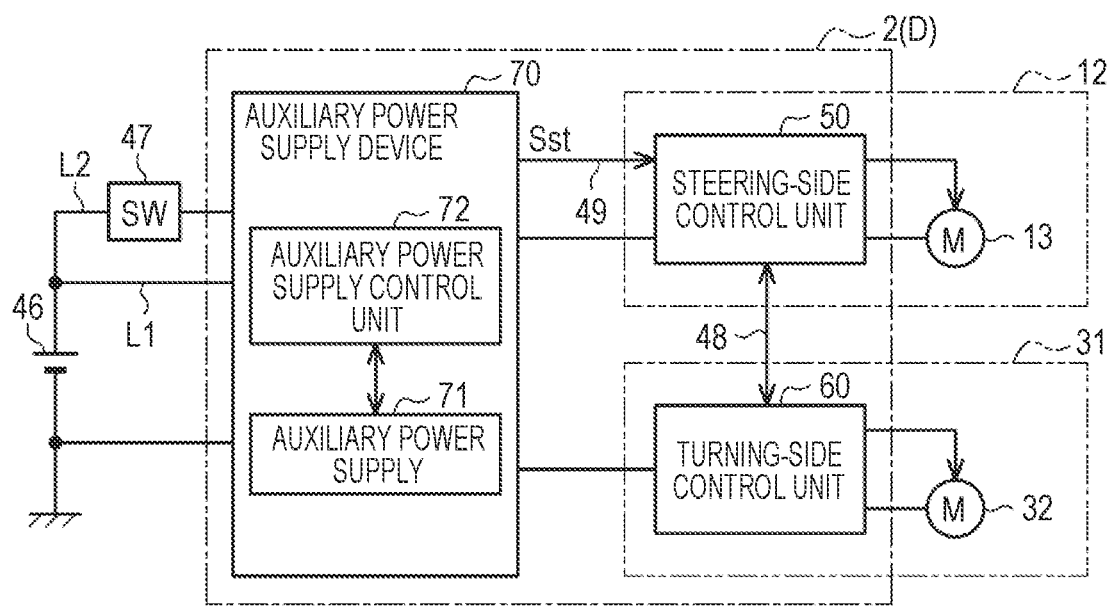
FIG. 2 is a diagram schematically illustrating a power supply system.
FIG. 3 is a diagram illustrating a power supply mode according to the first embodiment.

As illustrated in FIG. 2, the steering control device 2 includes a steering-side control unit 50, a turning-side control unit 60, and an auxiliary power supply device 70. The steering-side control unit 50 controls supply of electric power to the steering-side motor 13. The turning-side control unit 60 controls supply of electric power to the turning-side motor 32. The steering-side control unit 50 and the turning-side control unit 60 transmit and receive information via a local network 48 such as a serial communication network. The steering-side control unit 50 is provided as a part of the configuration of the steering unit 4, that is, the steering actuator 12. The turning-side control unit 60 is provided as a part of the configuration of the turning unit 6, that is, the turning actuator 31.

The power supply lines L1 and L2, that is, the main power supply 46, is/are connected to the steering-side control unit 50 which is a part of the configuration of the steering actuator 12 and the turning-side control unit 60 which is a part of the configuration of the turning actuator 31 via the auxiliary power supply device 70. That is, in this embodiment, the single auxiliary power supply device 70 is shared by the steering actuator 12 and the turning actuator 31.

The auxiliary power supply device 70 includes an auxiliary power supply 71 and an auxiliary power supply control unit 72. For example, the auxiliary power supply 71 is a capacitor such as a lithium-ion capacitor having the same function as the function of a secondary battery. The auxiliary power supply 71 serves as a power source of electric power supplied to the steering actuator 12 such that it operates, a power source of electric power supplied to the steering-side motor 13 such that it operates, and a power source of electric power supplied to the steering-side control unit 50 such that it operates. Similarly, the auxiliary power supply 71 serves as a power source of electric power supplied to the turning actuator 31 such that it operates, a power source of electric power supplied to the turning-side motor 32, and a power source of electric power supplied to the turning-side control unit 60. The auxiliary power supply 71 serves to assist supply of electric power to the steering-side control unit 50 and the turning-side control unit 60 according to a state of power supply from the main power supply 46. The auxiliary power supply 71 serves to back up supply of electric power to the steering-side control unit 50 and the turning-side control unit 60 instead of the main power supply 46 on the condition that electric power supplied from the main power supply 46 is decreased or cut off. In this embodiment, the auxiliary power supply 71 is an example of a second power supply.

The auxiliary power supply control unit 72 has a function of switching a connection state to the power supply line L1 for the purpose of charging and discharging of the auxiliary power supply 71 and includes, for example, a central processing unit (CPU) and a memory. The CPU of the auxiliary power supply control unit 72 executes a program stored in the memory at intervals of a predetermined calculation cycle. As a result, various processes are performed. The auxiliary power supply control unit 72 is configured to communicate with the steering-side control unit 50 via a dedicated signal line 49. On the other hand, the auxiliary power supply control unit 72 is not configured to communicate with the turning-side control unit 60 via a dedicated signal line. This is because a position at which the auxiliary power supply device 70 according to this embodiment is provided is set to be closer to the steering unit 4 between the steering unit 4 and the turning unit 6 in the steering system 1.

In this embodiment, the auxiliary power supply device 70 is provided as an auxiliary power supply device for the steering actuator 12 and the turning actuator 31, that is, the steering system 1. The auxiliary power supply device 70, the steering-side control unit 50, and the turning-side control unit 60 constitute a power supply system D. The power supply system D is applied as a power supply system for the steering actuator 12 and the turning actuator 31, that is, the steering system 1.

Power Supply Mode of Power Supply System D

As illustrated in FIG. 3, the power supply system D determines a power supply mode that is a mode of power supply to the auxiliary power supply control unit 72, the steering-side control unit 50, and the turning-side control unit 60 according to an on or off state of the start switch 47 ("SW," "ON," or "OFF" in the drawing).

When the start switch 47 is in the on state, the power supply system D performs control such that electric power is supplied to all of the control units 50, 60, and 72. In this case, electric power is supplied to the control units 50, 60, 72 from at least one of the main power supply 46 and the auxiliary power supply 71. That is, when the start switch 47 is in the on state, electric power is supplied to the steering actuator 12 and the turning actuator 31 from at least one of the main power supply 46 and the auxiliary power supply 71.

When the start switch 47 is in the off state, the power supply system D performs control such that electric power is supplied to the auxiliary power supply control unit 72 and the steering-side control unit 50 and performs control such that supply of electric power to the turning-side control unit 60 is cut off. In this case, the auxiliary power supply control unit 72 and the steering-side control unit 50 are supplied with electric power from the auxiliary power supply 71. In this embodiment, the auxiliary power supply control unit 72 and the steering-side control unit 50 secure electric power required for their operation using the auxiliary power supply 71 even when supply of electric power from the main power supply 46 is cut off. That is, when the start switch 47 is in the off state, the steering actuator 12 is supplied with electric power from the auxiliary power supply 71.

As illustrated in FIG. 2, the auxiliary power supply control unit 72 operates using electric power supplied from at least one of the main power supply 46 and the auxiliary power supply 71 and generates a power state signal Sst which is information indicating the on or off state of the start switch 47. When the start switch 47 is in the on state, the auxiliary power supply control unit 72 generates the power state signal Sst of "0 (zero value)" which is a value indicating the on state. When the start switch 47 is in the off state, the auxiliary power supply control unit 72 generates the power state signal Sst of "1" which is a value indicating the off state. The generated power state signal Sst is output to the steering-side control unit 50 via a dedicated signal line 49.

Function of Steering Control Device 2

In the steering control device 2, each of the steering-side control unit 50 and the turning-side control unit 60 includes a central processing unit (CPU) and a memory which are not illustrated. The CPU of each of the steering-side control unit 50 and the turning-side control unit 60 executes programs stored in the memory at intervals of a predetermined calculation cycle. As a result, various processes are performed.

A part of processes which are performed by the steering-side control unit 50 and the turning-side control unit 60 is illustrated in FIG. 4. FIG. 4 illustrates a part of processes of each kind realized by causing the CPU to execute a program stored in the memory.

The steering-side control unit 50 includes a steering-side current sensor 55. The steering-side current sensor 55 detects a steering-side actual current value Ia which is acquired from values of phase currents for the steering-side motor 13 flowing in connection lines between the steering-side control unit 50 and phase motor coils of the steering-side motor 13. The steering-side current sensor 55 acquires, as a current, a voltage drop of a shunt resistor connected to the source side of each switching element in an inverter (not illustrated) provided to correspond to the steering-side motor 13. In FIG. 4, for the purpose of convenience of description, the phase connection lines are collectively illustrated as one line, and the phase current sensors are collectively illustrated as one sensor.

The turning-side control unit 60 includes a turning-side current sensor 64. The turning-side current sensor 64 detects a turning-side actual current value Ib which is acquired from values of phase currents for the turning-side motor 32 flowing in connection lines between the turning-side control unit 60 and phase motor coils of the turning-side motor 32. The turning-side current sensor 64 acquires, as a current, a voltage drop of a shunt resistor connected to the source side of each switching element in an inverter (not illustrated) provided to correspond to the turning-side motor 32. In FIG. 4, for the purpose of convenience of description, the phase connection lines are collectively illustrated as one line, and the phase current sensors are collectively illustrated as one sensor.

Steering-Side Control Unit 50

As illustrated in FIG. 4, the steering torque Th, the vehicle speed V, the rotation angle $\theta a$, the turning-side actual current value Ib, the pinion angle $\theta p$, and the power state signal Sst are input to the steering-side control unit 50. The steering-side control unit 50 controls supply of electric power to the steering-side motor 13 based on the steering torque Th, the vehicle speed V, the rotation angle $\theta a$, the turning-side actual current value Ib, the pinion angle $\theta p$, and the power state signal Sst.

The steering-side control unit 50 includes a steering angle calculating unit 51, a steering-side normal control unit 52, a steering lock control unit 53, and a power supply control unit 54. The rotation angle $\theta a$ is input to the steering angle calculating unit 51. The steering angle calculating unit 51 converts the rotation angle $\theta a$ to a total angle in a range including a range exceeding 360 degrees, for example, by counting the number of rotations of the steering-side motor 13 from a steering neutral position which is a position of the steering wheel 3 at a time when the vehicle moves straight ahead. The steering angle calculating unit 51 calculates the steering angle $\theta s$ by multiplying the total angle acquired by conversion, by a conversion factor based on a rotation speed ratio of the steering-side speed reduction mechanism 14. The acquired steering angle $\theta s$ is output to the steering lock control unit 53. The steering angle $\theta s$ is output to the turning-side control unit 60.

The steering-side normal control unit 52 includes a target reaction torque calculating unit 52a. The steering torque Th, the vehicle speed V, the turning-side actual current value Ib, and the pinion angle $\theta p$ are input to the target reaction torque calculating unit 52a. The target reaction torque calculating unit 52a calculates a target reaction torque TT* which is a target control value of the steering reaction force for the steering wheel 3 which is to be generated from the steering-side motor 13, based on the steering torque Th, the vehicle speed V, the turning-side actual current value Ib, and the pinion angle $\theta p$. The acquired target reaction torque TT* is output to a multiplier 52b.

In the steering-side normal control unit 52, the power state signal Sst is input to a subtractor 52c. The subtractor 52c calculates an output gain K by subtracting the power state signal Sst from "1" stored in a storage unit 52d. The acquired output gain K is output to the multiplier 52b. The output gain K is a value for setting whether to reflect the target reaction torque TT* in the steering reaction force generated from the steering-side motor 13. The storage unit 52d is a predetermined storage area of a memory which is not illustrated.

When the power state signal Sst is "0," that is, when the start switch 47 is in the on state, the output gain K is calculated to be "1" which is a value indicating that the target reaction torque TT* is to be reflected in the steering reaction force generated from the steering-side motor 13. When the power state signal Sst is "1," that is, when the start switch 47 is in the off state, the output gain K is calculated to be "0 (zero value)" which is a value indicating that the target reaction torque TT* is not to be reflected in the steering reaction force generated from the steering-side motor 13. That is, in this embodiment, the target reaction torque TT* is not reflected in the steering reaction force generated from the steering-side motor 13 when the start switch 47 is in the off state.

When the output gain K is "1," that is, when the start switch 47 is in the on state, the multiplier 52b outputs the target reaction torque TT* to an adder 56 without any change such that the target reaction torque TT* is reflected in the steering reaction force generated from the steering-side motor 13. When the output gain K is "0," that is, when the start switch 47 is in the off state, the multiplier 52b outputs a zero value as the target reaction torque TT* to the adder 56 such that the target reaction torque TT* is not reflected in the steering reaction force generated from the steering-side motor 13.

The steering lock control unit 53 includes a target steering angle calculating unit 53a and a steering angle feedback control unit ("STEERING ANGLE FB CONTROL UNIT" in the drawing) 53b. The power state signal Sst and the steering angle $\theta s$ are input to the target steering angle calculating unit 53a. The target steering angle calculating unit 53a holds the input steering angle $\theta s$ at the time at which "1" is input as the power state signal Sst. The target steering angle calculating unit 53a calculates the held steering angle $\theta s$ as a target steering angle $\theta s^*$. The target steering angle $\theta s^*$ is a target control value of the steering angle $\theta s$ acquired as the result of rotation of the steering wheel 3. The acquired target steering angle $\theta s^*$ is output to the steering angle feedback control unit 53b.

The target steering angle $\theta s^*$ and the steering angle $\theta s$ are input to the steering angle feedback control unit 53b. The steering angle feedback control unit 53b calculates a target angle torque $T\theta^*$ through feedback control for the steering angle $\theta s$ such that the steering angle $\theta s$ conforms to the target steering angle $\theta s^*$. The target angle torque $T\theta^*$ is a target control value of the steering reaction force for the steering wheel 3 which is to be generated from the steering-side motor 13. The acquired target angle torque $T\theta^*$ is output to a multiplier 53c.

In the steering lock control unit 53, the power state signal Sst is input to the multiplier 53c. When the power state signal Sst is "1," that is, when the start switch 47 is in the off state, the multiplier 53c outputs the target angle torque $T\theta^*$ to an adder 56 without any change such that the target angle torque $T\theta^*$ is reflected in the steering reaction force generated from the steering-side motor 13. When the power state signal Sst is "0," that is, when the start switch 47 is in the on state, the multiplier 53c outputs a zero value as the target angle torque $T\theta^*$ to the adder 56 such that the target angle torque Tθ* is not reflected in the steering reaction force generated from the steering-side motor 13.

The adder 56 calculates a target reaction torque command value Ts* by summing the target reaction torque TT* acquired by the steering-side normal control unit 52 and the target angle torque Tθ* acquired by the steering lock control unit 53. When the start switch 47 is in the on state, the target angle torque Tθ* is a zero value and thus the target reaction torque command value Ts* is the target reaction torque TT* acquired by the steering-side normal control unit 52. On the other hand, when the start switch 47 is in the off state, the target reaction torque TT* is a zero value and thus the target reaction torque command value Ts* is the target angle torque Tθ* acquired by the steering lock control unit 53. The acquired target reaction torque command value Ts* is output to the power supply control unit 54.

The target reaction torque command value Ts*, the rotation angle θa, and the steering-side actual current value Ia are input to the power supply control unit 54. The power supply control unit 54 calculates a current command value Ia* for the steering-side motor 13 based on the target reaction torque command value Ts*. The power supply control unit 54 calculates a difference between the current command value Ia* and a current value on a d-q coordinate system acquired by converting the steering-side actual current value Ia acquired by the steering-side current sensor 55 based on the rotation angle θa, and controls supply of electric power to the steering-side motor 13 such that the difference is cancelled out. Accordingly, the steering-side motor 13 generates a reaction force corresponding to the target reaction torque command value Ts* and rotates by an angle corresponding to the target reaction torque command value Ts*.

Turning-Side Control Unit 60

As illustrated in FIG. 4, the rotation angle θb and the steering angle θs are input to the turning-side control unit 60. The turning-side control unit 60 controls supply of electric power to the turning-side motor 32 based on the rotation angle θb and the steering angle θs.

The turning-side control unit 60 includes a pinion angle calculating unit 61, a pinion angle feedback control unit ("PINION ANGLE F/B CONTROL UNIT" in the drawing) 62, and a power supply control unit 63. The rotation angle θb is input to the pinion angle calculating unit 61. The pinion angle calculating unit 61 converts the rotation angle θb to a total angle in a range including a range exceeding 360 degrees, for example, by counting the number of rotations of the turning-side motor 32 from a rack neutral position which is a position of the rack shaft 22 when the vehicle travels straight ahead. The pinion angle calculating unit 61 calculates the pinion angle θp which is an actual rotation angle of the pinion shaft 21 by multiplying the total angle which is acquired by conversion, by a conversion factor based on a rotation speed ratio of the transmission mechanism 33, a lead of the conversion mechanism 34, and a rotation speed ratio of the rack and pinion mechanism 24. The acquired pinion angle θp is output to the pinion angle feedback control unit 62. The pinion angle θp is output to the steering-side control unit 50, that is, the steering-side normal control unit 52.

The steering angle θs and the pinion angle θp are input to the pinion angle feedback control unit 62. The pinion angle feedback control unit 62 calculates a turning force command value Tt* through feedback control for the pinion angle θp such that the pinon angle θp conforms to the steering angle θs which is the target pinion angle θp*. The acquired turning force command value Tt* is output to the power supply control unit 63.

The turning force command value Tt*, the rotation angle θb, and the turning-side actual current value Ib are input to the power supply control unit 63. The power supply control unit 63 calculates a current command value Ib* for the turning-side motor 32 based on the turning force command value Tt*. The power supply control unit 63 calculates a difference between the current command value Ib* and a current value on the d-q coordinate system acquired by converting the turning-side actual current value Ib detected by the turning-side current sensor 64 based on the rotation angle θb, and controls supply of electric power to the turning-side motor 32 such that the difference is cancelled out. Accordingly, the turning-side motor 32 rotates by an angle corresponding to the turning force command value Tt*.

Details of Control Performed According to Power Supply Mode

Figure 5A:
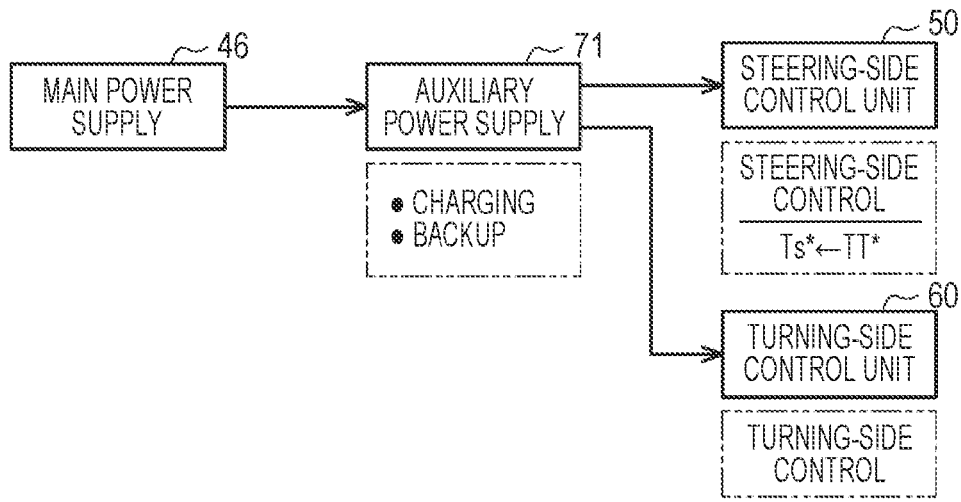
FIGS. 5A and 5B are diagrams illustrating details of control which is performed based on a power supply mode according to the first embodiment.

As illustrated in FIG. 5A, when the start switch 47 is in the on state ("SW: ON" in the drawing), electric power from the main power supply 46 is supplied to the steering-side control unit 50 and the turning-side control unit 60 via the auxiliary power supply device 70. In this case, the auxiliary power supply 71 of the auxiliary power supply device 70 is charged with electric power supplied from the main power supply 46 and backs up supply of electric power from the main power supply 46 according to necessity.

The steering-side control unit 50 operates with electric power supplied from the auxiliary power supply 71. In this case, the steering-side control unit 50 performs control using the target reaction torque command value Ts* in which the target reaction torque TT* is reflected because the start switch 47 is in the on state. That is, when the start switch 47 is in the on state, the steering-side control unit 50 performs power-on steering-side control on the steer-by-wire steering system 1 such that the state of the turning unit 6 is reflected in the state of the steering unit 4, the steering unit 4 and the turning unit 6 being separated from each other. Accordingly, it is possible to give a driver an appropriate feeling of response corresponding to a road-surface reaction force.

The turning-side control unit 60 operates with electric power supplied from the auxiliary power supply 71. In this case, the turning-side control unit 60 performs control for operating the turning-side motor 32 because the start switch 47 is in the on state. That is, when the start switch 47 is in the on state, the turning-side control unit 60 performs power-on turning-side control on the steer-by-wire steering system 1 such that the state of the steering unit 4 is reflected in the state of the turning unit 6, the steering unit 4 and the turning unit 6 being separated from each other. Accordingly, it is possible to turn the turning wheels 5 such that an angle corresponding to a driver's steering operation is achieved while the start switch 47 is in the on state.

Figure 5B:
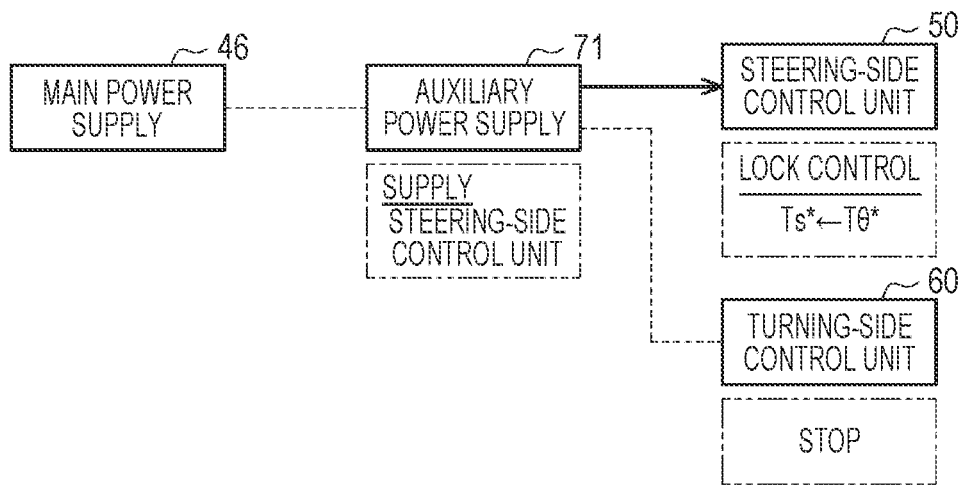

As illustrated in FIG. 5B, when the start switch 47 is in the off state ("SW: OFF" in the drawing), electric power from the main power supply 46 is cut off and electric power is supplied to the steering-side control unit 50 from the auxiliary power supply device 70. Electric power from the auxiliary power supply device 70 to the turning-side control unit 60 is cut off. In this case, the auxiliary power supply 71 of the auxiliary power supply device 70 serves as a source of electric power for the steering-side control unit 50. The auxiliary power supply 71 also serves as a source of electric power for the auxiliary power supply control unit 72.

The steering-side control unit 50 operates with electric power supplied from the auxiliary power supply 71. In this case, since the start switch 47 is in the off state, the steering-side control unit 50 performs control using the target reaction torque command value Ts* in which the target angle torque Tθ* is reflected. That is, the steering-side control unit 50 performs power-off steering-side control on the steer-by-wire steering system 1 such that difference between the state of the turning unit 6 and the state of the steering unit 4 which are separated from each other is curbed when the start switch 47 is in the off state. In this embodiment, lock control for curbing rotation of the steering wheel 3 is performed as power-off steering-side control using the torque of the steering-side motor 13. That is, in this embodiment, the steering-side motor 13 is an example of a rotation curbing unit.

Figure 6:
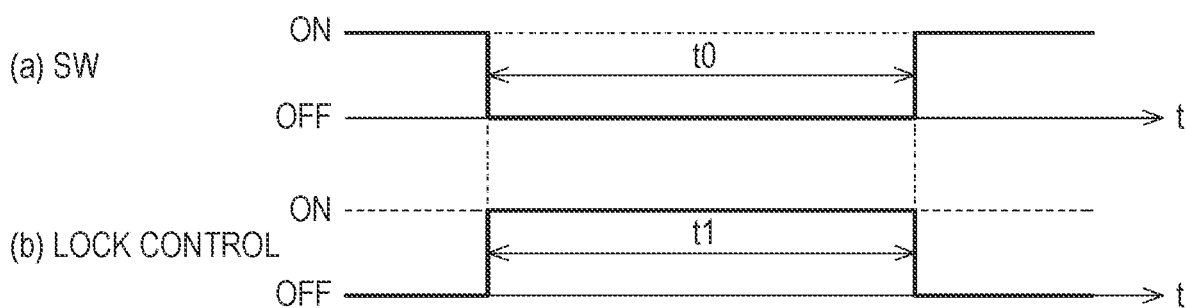
FIG. 6 is a timing chart including a portion (a) and a portion (b) illustrating details of control which is performed based on a power supply mode according to the first embodiment.

For example, as illustrated in a portion (a) of FIG. 6, a period in which the start switch 47 is in the off state, i.e., a period after the start switch 47 has been switched from the on state ("ON" in the drawing) to the off state ("OFF" in the drawing) until the start switch 47 is switched to the on state next is a first power-off period t0.

In this case, as illustrated in a portion (b) of FIG. 6, lock control for the steering-side control unit 50 is continuously performed in an operating period t1 that coincides with the whole first power-off period t0. Accordingly, it is possible to prevent rotation of the steering wheel 3, that is, to lock the steering wheel 3, using the torque of the steering-side motor 13 even when a driver intends to steer the steering wheel while the start switch 47 is in the off state. Even when the steering wheel 3 rotates while the start switch 47 is in the off state, it is possible to return the position of the steering wheel 3 to a position at a time when the start switch 47 is switched to the off state with respect to the target steering angle θs*, using the torque of the steering-side motor 13.

Supply of electric power from both of the main power supply 46 and the auxiliary power supply 71 to the turning-side control unit 60 is cut off and the turning-side control unit 60 cannot operate. In this case, since the start switch 47 is in the off state, the turning-side control unit 60 stops control for operating the turning-side motor 32. That is, when the start switch 47 is in the off state, the turning-side control unit 60 cannot reflect the state of the steering unit 4 in the state of the turning unit 6, in the state where the steering unit 4 and the turning unit 6 are separated from each other. Accordingly, even when a driver's steering operation is performed while the start switch 47 is in the off state, the turning wheels 5 cannot be turned such that an angle corresponding to the steering operation is achieved.

Operation According to First Embodiment

According to this embodiment, electric power required for the operation of the steering-side motor 13 is supplied from the auxiliary power supply 71 in the operating period t1 which is illustrated in the portion (b) of FIG. 6, and in which electric power from the main power supply 46 is cut off and the start switch 47 is in the off state. That is, in the operating period t1, electric power does not need to be supplied from the main power supply 46 even when the steering-side motor 13 operates to curb rotation of the steering wheel 3. Accordingly, in the first power-off period t0 which is illustrated in the portion (a) of FIG. 6 and in which the start switch 47 is in the off state, it is possible to reduce power consumption in the main power supply 46 even when the steering-side motor 13 operates.

Advantages of First Embodiment (1-1) In this embodiment, since electric power required for the operation of the steering-side motor 13 is supplied from the auxiliary power supply 71 in the operating period t1, it is possible to reduce power consumption in the main power supply 46 even when the steering-side motor 13 operates. In this case, it is possible to appropriately secure electric power required for the operation of the steering-side motor 13 when the start switch 47 is in the off state, in order that the main power supply 46 can supply electric power normally when the start switch 47 is switched to the on state next.

(1-2) Since the operating period t1 is set to a period that coincides with the whole first power-off period t0, it is possible to appropriately curb an angle difference between the angle of the steering wheel 3 and the angle of the turning wheels 5.

(1-3) In this embodiment, the steering-side motor 13 is employed as a rotation curbing unit that curbs rotation of the steering wheel 3. In this case, even in the first power-off period t0, electric power needs to be supplied to at least the steering actuator 12 such that the steering actuator 12 can operate in the operating period t1.

In this regard, in the embodiment, it is possible to realize supply of electric power to the steering actuator 12 in a state in which a load on the main power supply 46 is curbed, even in the first power-off period t0. Accordingly, even when the steering-side motor 13 is employed as the rotation curbing unit, it is possible to appropriately secure electric power required for the operation of the steering-side motor 13, in order that the main power supply 46 can supply electric power normally when the start switch 47 is switched to the on state next. In this case, it is not necessary to employ a mechanical structure with relatively low power consumption as the rotation curbing unit. This is effective for realizing a decrease in size, simplification of the configuration, a decrease in manufacturing cost, and the like for the steering system 1, particularly, the steering actuator 12.

(1-4) In this embodiment, the auxiliary power supply 71 is used as the second power supply. In this case, when supply of electric power required for the operation of the steering-side motor 13 when the start switch 47 is in the off state is realized, it is possible to decrease the extent of modification for adding the configuration of the second power supply to the steering system 1.

Second Embodiment

A steering system according to a second embodiment will be described below with reference to the accompanying drawings. Differences from the first embodiment will be mainly described. The same elements as in the first embodiment will be referred to by the same reference signs, and the like, and description thereof will not be repeated.

As indicated by an alternate long and two short dashes line in FIG. 1, a vehicular control device 80 is connected to the steering control device 2 via the onboard network 45. In this embodiment, a key authentication device 81, a door lock device 82, and a seat belt device 83 are provided as the vehicular control device 80. The key authentication device 81, the door lock device 82, and the seat belt device 83 are provided in the vehicle separately from the steering control device 2.

Key Authentication Device 81

The key authentication device 81 permits use of the vehicle based on key information. The key information is, for example, information that is stored in a vehicle key KE such as a remote controller key or a smartphone carried by a driver. The key authentication device 81 performs radio communication with the vehicle key KE, and enables locking and unlocking of a vehicle door DR and enables operation of the start switch 47 on the condition that the radio communication has been established, thereby permitting use of the vehicle. The coverage of the radio communication is often a relatively short predetermined range such as 1 m from the vehicle. The key authentication device 81 generates a key position signal Ske that is information indicating a key position of the vehicle key KE with respect to the vehicle based on whether radio communication with the vehicle key KE has been established. When the radio communication with the vehicle key KE has been established, the key authentication device 81 generates the key position signal Ske of "1" which is a value indicating that a driver is located within a predetermined distance from the vehicle. In this case, it can be determined that there is a high possibility that the driver may board or alight from the vehicle as a boarding-alighting state of the driver with respect to the vehicle, and it is assumed that there is a high possibility that the driver may contact the steering wheel 3. When the radio communication with the vehicle key KE has not been established, the key authentication device 81 generates the key position signal Ske of "0 (zero value)" which is a value indicating that the driver is not located within the predetermined distance from the vehicle, that is, the driver is away from the vehicle by a predetermined distance or more. In this case, it can be determined that there is a low possibility that the driver may board or alight from the vehicle as the boarding-alighting state of the driver with respect to the vehicle, and it is assumed that there is a low possibility that the driver may contact the steering wheel 3. The acquired key position signal Ske is output to the steering control device 2, that is, the auxiliary power supply device 70, via the onboard network 45.

Door Lock Device 82

The door lock device 82 controls switching between locking and unlocking of the vehicle door DR. The door lock device 82 generates a door lock signal Sdl that is information indicating a lock state that indicates locking or unlocking of the vehicle door DR. When the vehicle door DR is unlocked, the door lock device 82 generates the door lock signal Sdl of "1" which is a value indicating that the vehicle door DR is unlocked. In this case, when the possibility of boarding or alighting from the vehicle as the boarding-alighting state of the driver with respect to the vehicle (i.e., the possibility that the driver may board or alight from the vehicle) is determined to be high in combination with the key position signal Ske, there is a high possibility that the driver may contact the steering wheel 3. When the vehicle door DR is locked, the door lock device 82 generates the door lock signal Sdl of "0 (zero value)" which is a value indicating that the vehicle door DR is locked. In this case, when the possibility of boarding or alighting from the vehicle as the boarding-alighting state of the driver with respect to the vehicle is determined to be low, there is a low possibility that the driver may contact the steering wheel 3. The acquired door lock signal Sdl is output to the steering control device 2, that is, the auxiliary power supply device 70, via the onboard network 45.

Seat Belt Device 83

The seat belt device 83 detects a seat load indicating loads on a passenger's seat and a rear seat other than a driver's seat on which a driver sits. The seat load is detected, for example, using a load sensor Ps of the seat belt device 83. The seat belt device 83 generates a seat state signal Ssb that is information indicating whether an occupant other that a driver is present on at least one of the passenger's seat and the rear seat based on the seat load. When a seat load with a value in a predetermined range for determining that an occupant is present on at least one of the passenger's seat and the rear seat is detected, the seat belt device 83 generates the seat state signal Ssb of "1" which is a value indicating that an occupant is present on at least one of the seats. In this case, there is a high possibility that the occupant may contact the steering wheel 3 because the occupant is present in the cabin. When a seat load with a value in a predetermined range for determining that an occupant is not present on the passenger's seat and the rear seat is detected, the seat belt device 83 generates the seat state signal Ssb of "0 (zero value)" which is a value indicating that an occupant is not present on the seats. In this case, when the possibility of boarding or alighting from the vehicle as the boarding-alighting state of the driver with respect to the vehicle is determined to be low in combination with the key position signal Ske, there is a low possibility that the driver may contact the steering wheel 3. The acquired seat state signal Ssb is output to the steering control device 2, that is, the auxiliary power supply device 70, via the onboard network 45.

Auxiliary Power Supply Device 70

As illustrated in FIG. 7, the key position signal Ske, the door lock signal Sdl, and the seat state signal Ssb are input to the auxiliary power supply control unit 73 of the auxiliary power supply device 70 according to this embodiment. The auxiliary power supply control unit 73 generates a power state signal Sst based on the key position signal Ske, the door lock signal Sdl, the seat state signal Ssb, and the on or off state of the start switch 47.

Specifically, the auxiliary power supply control unit 73 includes a state determining unit 73a. The key position signal Ske, the door lock signal Sdl, and the seat state signal Ssb are input to the state determining unit 73a. The state determining unit 73a calculates an occupant state gain G based on the key position signal Ske, the door lock signal Sdl, and the seat state signal Ssb. The occupant state gain G is an index for indicating the height of the possibility that a driver or an occupant may contact the steering wheel 3 and is calculated to be "1" when there is a high possibility that the driver or the occupant may contact the steering wheel 3 and to be "0 (zero value)" when there is a low possibility. One example of the auxiliary power supply control unit 73 including the state determining unit 73a is an electronic control unit including a processor.

For example, when at least one of the key position signal Ske, the door lock signal Sdl, and the seat state signal Ssb is "1," the occupant state gain G is calculated to be "1" which is a value indicating that there is a high possibility that the driver or the occupant may contact the steering wheel 3. When all of the key position signal Ske, the door lock signal Sdl, and the seat state signal Ssb are "0," the occupant state gain G is calculated to be "0" which is a value indicating that there is a low possibility that the driver or the occupant may contact the steering wheel 3.

The auxiliary power supply control unit 73 generates the power state signal Sst based on the occupant state gain G. Specifically, when the start switch 47 is in the on state, the auxiliary power supply control unit 73 generates "0" as the power state signal Sst regardless of the value of the occupant state gain G and outputs the generated power state signal Sst to the steering-side control unit 50. In this case, the auxiliary power supply control unit 73 performs control such that the steering-side control unit 50 is supplied with electric power from at least one of the main power supply 46 and the auxiliary power supply 71.

When the start switch 47 is in the off state and the occupant state gain G is "1," the auxiliary power supply control unit 73 generates "1" as the power state signal Sst and outputs the generated power state signal Sst to the steering-side control unit 50. In this case, the auxiliary power supply control unit 73 performs control such that the steering-side control unit 50 is supplied with electric power from the auxiliary power supply 71 and performs control such that supply of electric power to the turning-side control unit 60 is cut off.

When the start switch 47 is in the off state and the occupant state gain G is "0," the auxiliary power supply control unit 73 generates "0" as the power state signal Sst and outputs the generated power state signal Sst to the steering-side control unit 50. In this case, the auxiliary power supply control unit 73 performs control such that supply of electric power to the steering-side control unit 50 and the turning-side control unit 60 is cut off.

Power Supply Mode of Power Supply System D

As illustrated in FIG. 8, the power supply system D according to this embodiment determines a power supply mode that is a mode of power supply to the auxiliary power supply control unit 72, the steering-side control unit 50, and the turning-side control unit 60 according to the on or off state of the start switch 47 ("SW," "ON," or "OFF" in the drawing) and the value of the occupant state gain G.

When the start switch 47 is in the on state, the power supply system D performs control such that electric power is supplied to all of the control units 50, 60, and 72 regardless of the value of the occupant state gain G. This is the same as in the first embodiment.

When the start switch 47 is in the off state and the occupant state gain G is "1," the power supply system D performs control such that electric power is supplied to the auxiliary power supply control unit 72 and the steering-side control unit 50 and performs control such that supply of electric power to the turning-side control unit 60 is cut off. In this case, the auxiliary power supply control unit 72 and the steering-side control unit 50 are supplied with electric power from the auxiliary power supply 71. In this embodiment, the auxiliary power supply control unit 72 and the steering-side control unit 50 secure electric power required for their operation using the auxiliary power supply 71 when supply of electric power from the main power supply 46 is cut off and there is a high possibility that the driver or the occupant may contact the steering wheel 3. That is, when the start switch 47 is in the off state and there is a high possibility that the driver or the occupant may contact the steering wheel 3, the steering actuator 12 is supplied with electric power from the auxiliary power supply 71.

When the start switch 47 is in the off state and the occupant state gain G is "0," the power supply system D performs control such that electric power is supplied to the auxiliary power supply control unit 72 and performs control such that supply of electric power to the steering-side control unit 50 and the turning-side control unit 60 is cut off. In this case, the auxiliary power supply control unit 72 is supplied with electric power from the auxiliary power supply 71. In this embodiment, the auxiliary power supply control unit 72 secures electric power required for its operation using the auxiliary power supply 71 when supply of electric power from the main power supply 46 is cut off. On the other hand, when supply of electric power from the main power supply 46 is cut off and there is a low possibility that the driver or the occupant may contact the steering wheel 3, the steering-side control unit 50 does not secure electric power required for its operation from the auxiliary power supply 71. That is, when the start switch 47 is in the off state and there is a low possibility that the driver or the occupant may contact the steering wheel 3, supply of electric power to the steering actuator 12 from the auxiliary power supply 71 is cut off.

Details of Control Performed According to Power Supply Mode

Figure 9A:
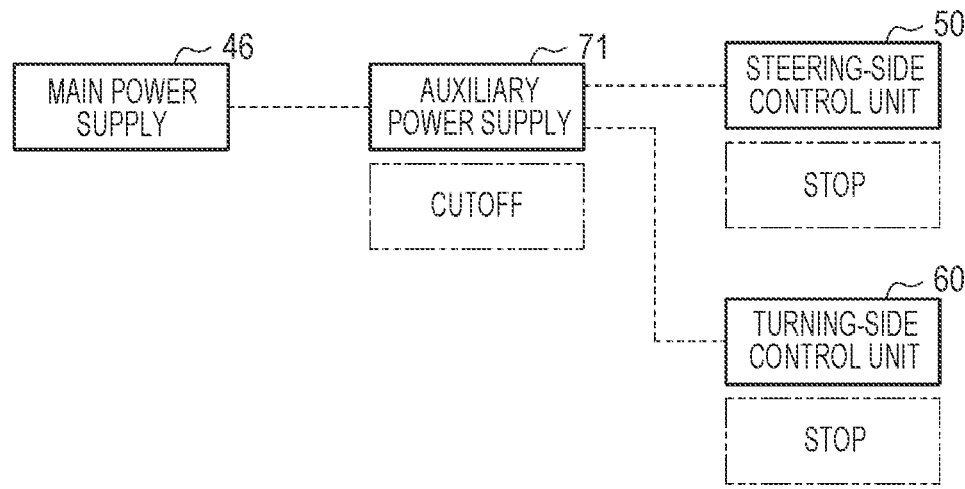
FIGS. 9A and 9B are diagrams illustrating details of control which is performed based on a power supply mode according to the second embodiment.

As illustrated in FIG. 9A, when the start switch 47 is in the off state and the occupant state gain G is "0" ("SW: OFF+NO OCCUPANT" in the drawing), supply of electric power to the steering-side control unit 50 and the turning-side control unit 60 from the main power supply 46 and the auxiliary power supply device 70 is cut off. In this case, supply of electric power from both of the main power supply 46 and the auxiliary power supply 71 is cut off and thus the steering-side control unit 50 and the turning-side control unit 60 cannot operate. When the start switch 47 is in the off state and the occupant state gain G is "0," the possibility that the driver or the occupant may contact the steering wheel 3 is low and thus there is a low possibility that the states of the steering unit 4 and the turning unit 6 which are separated from each other may become different from each other although the start switch 47 is in the off state.

Figure 9B:
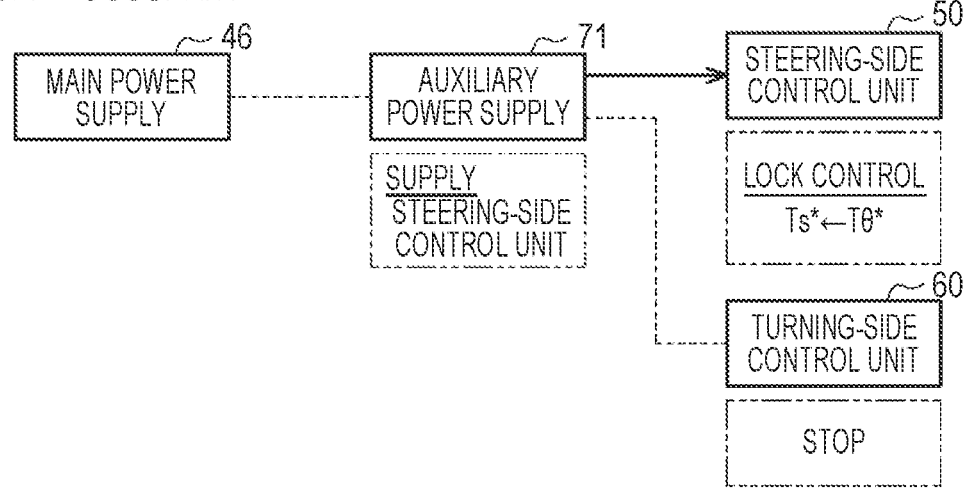

As illustrated in FIG. 9B, when the start switch 47 is in the off state and the occupant state gain G is "1" ("SW: OFF+OCCUPANT" in the drawing), supply of electric power from the main power supply 46 is cut off and the steering-side control unit 50 is supplied with electric power from the auxiliary power supply device 70. Supply of electric power to the turning-side control unit 60 from the auxiliary power supply device 70 is cut off. In this case, the auxiliary power supply 71 of the auxiliary power supply device 70 serves as a source of electric power for the steering-side control unit 50. The auxiliary power supply 71 also serves as a source of electric power for the auxiliary power supply control unit 72.

The steering-side control unit 50 operates with electric power supplied from the auxiliary power supply 71. In this case, since the start switch 47 is in the off state, that is, the power state signal Sst is "1," the steering-side control unit 50 performs control using the target reaction torque command value Ts* in which the target angle torque Tθ* is reflected. That is, the steering-side control unit 50 performs lock control.

Figure 10:
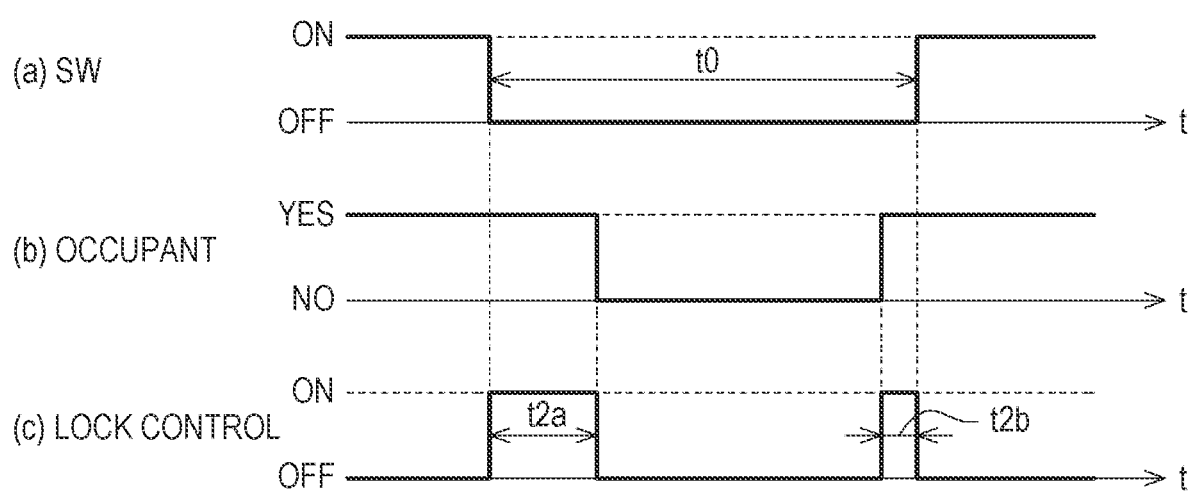
FIG. 10 is a timing chart including a portion (a) to a portion (c) illustrating details of control which is performed based on a power supply mode according to the second embodiment.

For example, as illustrated in a portion (a) and a portion (b) of FIG. 10, the occupant state gain G is maintained at "1" ("OCCUPANT: YES" in the drawing) in a period in which there is a high possibility that the driver or the occupant may contact the steering wheel 3 after the first power-off period t0 has started. Thereafter, when the possibility that the driver or the occupant may contact the steering wheel 3 is lowered, the occupant state gain G becomes "0" ("OCCUPANT: NO" in the drawing).

In this case, as illustrated in a portion (c) of FIG. 10, lock control for the steering-side control unit 50 is continuously performed in operating periods t2a and t2b in which the occupant state gain G is "1" ("OCCUPANT: YES" in the drawing) in the first power-off period t0.

Specifically, lock control starts its operation in the operating period t2a after the first power-off period t0 has started due to turning-off of the start switch 47 with alighting of the driver. Subsequently, the lock control ends its operation with separation of the driver from the vehicle by a predetermined distance, and the operating period t2a ends. Thereafter, lock control starts its operation in the operating period t2b when the driver approaches the vehicle to be located within the predetermined distance from the vehicle in the first power-off period t0. Subsequently, lock control ends its operation with ending of the first power-off period t0 due to turning-on of the start switch 47 with the driver's boarding, and the operating period t2b ends.

Advantages of Second Embodiment (2-1) In this embodiment, the steering-side motor 13 can be caused to operate such that rotation of the steering wheel 3 is curbed, in a situation in which the driver is away from the vehicle and the possibility that the driver may contact the steering wheel 3 is high. In this case, the period in which the steering-side motor 13 operates can be set to be shorter than the first power-off period t0. This is effective for curbing consumption of electric power in the auxiliary power supply 71.

(2-2) Based on the key position, it is possible to determine the boarding-alighting state of the driver with respect to the vehicle and to determine the possibility of contact of the driver with the steering wheel 3. Based on the key position and the lock state of the vehicle door DR, it is possible to more accurately determine the boarding-alighting state of the driver with respect to the vehicle and to more accurately determine the possibility of contact of the driver with the steering wheel 3. Accordingly, the state determining unit 73a can appropriately determine the state of the driver indicating whether the driver is away from or approaching the vehicle.

(2-3) Regarding the key position and the lock state of the vehicle door DR, even when the lock state of the vehicle door DR is replaced with an open-closed state of the vehicle door DR (i.e., an open-closed state indicating an open state or a closed state of the vehicle door DR), it is possible to more accurately determine the possibility of contact of the driver with the steering wheel 3. In this case, the door lock device 82 can detect the open-closed state of the vehicle door DR in the driver's seat.

As indicated by an alternate long and two short dashes line in FIG. 7, a door open-closed signal Sds that is information indicating whether the vehicle door DR in the driver's seat is open instead of the door lock signal Sdl can be input to the state determining unit 73a. For example, the door lock device 82 generates the door open-closed signal Sds that is information indicating whether the vehicle door DR in the driver's seat is open instead of the door lock signal Sdl. In this case, when the vehicle door DR in the driver's seat is open, the door lock device 82 generates the door open-closed signal Sds of "1." When the vehicle door DR in the driver's seat is closed, the door lock device 82 generates the door open-closed signal Sds of "0 (zero value)." The acquired door open-closed signal Sds is output to the steering control device 2, that is, the auxiliary power supply device 70, via the onboard network 45.

(2-4) In this embodiment, since a state of an occupant other than a driver is also considered, it is possible to consider the possibility of contact of an occupant other than the driver with the steering wheel 3.

(2-5) As indicated by an alternate long and two short dashes line in FIG. 1, even with a configuration in which the state of an occupant other than the driver is detected with a cabin camera CM provided in the cabin, it is possible to consider the possibility of contact of an occupant other than the driver with the steering wheel 3. For example, a cabin monitoring device 84 is provided as the vehicular control device 80. The cabin monitoring device 84 is provided in the vehicle separately from the steering control device 2. The cabin monitoring device 84 monitors the state of the cabin for the purpose of theft prevention of the vehicle or recording of circumstances near the vehicle. The state of the cabin is detected by the cabin camera CM of the cabin monitoring device 84. The cabin monitoring device 84 can detect whether an occupant other than the driver is present on the passenger's seat and the rear seat based on the cabin camera CM.

As indicated by an alternate long and two short dashes line in FIG. 7, a cabin monitoring signal Ssc that is information indicating a state of an occupant other than the driver may be input to the state determining unit 73a, instead of the seat state signal Ssb. For example, the cabin monitoring device 84 generates the cabin monitoring signal Ssc that is information indicating the state of an occupant other than the driver. In this case, when an occupant other than the driver is present in the cabin, the cabin monitoring device 84 generates the cabin monitoring signal Ssc of "1." When an occupant other than the driver is not present in the cabin, the cabin monitoring device 84 generates the cabin monitoring signal Ssc of "0 (zero value)." The acquired cabin monitoring signal Ssc is output to the steering control device 2, that is, the auxiliary power supply device 70, via the onboard network 45.

Other Embodiments

The aforementioned embodiments may be modified as follows. The following other embodiments can be combined unless technical contradiction arises.

In the second embodiment, the state determining unit 73a may not consider the state of an occupant other than the driver. In this case, the seat state signal Ssb may not be input to the state determining unit 73a. Even when the seat state signal Ssb is input to the state determining unit 73a, the seat state signal Ssb may not be used to generate the occupant state gain G. The same applies to the cabin monitoring signal Ssc.

In the second embodiment, the state determining unit 73a may use at least the key position signal Ske to calculate the occupant state gain G. In this case, the door lock signal Sdl and the seat state signal Ssb may not be used in the state determining unit 73a. Both the door lock signal Sdl and the door open-closed signal Sds may be used in the state determining unit 73a. Both the seat state signal Ssb and the cabin monitoring signal Ssc may be used in the state determining unit 73a.

In the second embodiment, the auxiliary power supply control unit 73 may not output the power state signal Sst when the occupant state gain G is "0" and the start switch 47 is in the off state.

In the second embodiment, the function of the state determining unit 73a may be realized as the function of the steering-side control unit 50 or the turning-side control unit 60, that is, the function of the steering control device 2. In this case, the steering system 1 may be configured to be supplied with electric power from the power supply line L1 regardless of the on or off state of the start switch 47. In the operating periods t2a and t2b, electric power required for the operation of the steering-side motor 13 is supplied from the auxiliary power supply 71.

In the aforementioned embodiments, the auxiliary power supply control unit 72 may be configured to be supplied with electric power from the power supply line L1 regardless of the on or off state of the start switch 47. In this case, the auxiliary power supply control unit 72 can charge the auxiliary power supply 71 even when the start switch 47 is in the off state.

In the aforementioned embodiments, even when the start switch 47 is in the off state, lock control may be performed according to a scheduled date and time indicating a schedule in which the driver may use the vehicle. That is, the operating period t1 or the operating period t2b may start according to the scheduled date and time even when the start switch 47 is in the off state. For example, the scheduled date and time can be set for the vehicle or the steering system 1 by the driver using an application of a navigation system, a smartphone, or the like. In this case, the auxiliary power supply control unit 72 is configured to perform control such that the steering-side control unit 50 is supplied with electric power from the auxiliary power supply 71 according to the scheduled date and time which can be identified using a function such as a real time clock even when the start switch 47 is in the off state. The steering-side control unit 50 may be configured to autonomously perform lock control according to the scheduled date and time which can be identified using a function such as a real time clock even when the start switch 47 is in the off state. In the second embodiment, when the start switch 47 is in the off state, lock control may be performed according to the scheduled date and time regardless of the value of the occupant state gain G.

In the aforementioned embodiments, the steering lock control unit 53 may realize lock control based on phase short-circuit by short-circuiting the connection lines between the steering-side control unit 50 and the phase motor coils of the steering-side motor 13. In this case, the turning-side control unit 60 may be configured to be supplied with electric power from the auxiliary power supply 71 when the start switch 47 is in the off state. For example, with the lock control based on phase short-circuit, there is a possibility that the steering wheel 3 may rotate due to application of a greater force than expected. In this regard, in the case where the turning-side control unit 60 can operate even when the start switch 47 is in the off state, the turning wheels 5 can be turned by an amount corresponding to the rotation of the steering wheel 3. In this case, it is possible to appropriately curb an angle difference between the angle of the steering wheel 3 and the angle of the turning wheels 5.

In the aforementioned embodiments, the steering lock control unit 53 may realize lock control based on so-called damping control for controlling a steering speed which is a rate of change of the steering angle θs. For example, the steering lock control unit 53 may perform damping control as lock control by, e.g., setting a target speed of the steering speed to a zero value.

In the aforementioned embodiments, a dedicated power supply separate from the auxiliary power supply 71 may be provided as the second power supply that supplies electric power to the steering-side control unit 50, that is, the steering-side motor 13, when the start switch 47 is in the off state.

In the aforementioned embodiments, it may be possible to curb rotation of the steering wheel 3 using a mechanical configuration as the rotation curbing unit. In this case, electric power is required for switching to a state in which the rotation of the steering wheel 3 is curbed or maintaining the state in which the rotation of the steering wheel 3 is curbed, but it is possible to curb consumption of electric power in the main power supply 46.

In the aforementioned embodiments, an electric double layer capacitor or a secondary battery may be employed instead of the lithium ion capacitor for the auxiliary power supply 71. In the aforementioned embodiments, the auxiliary power supply device 70 may be configured to operate to step up electric power supplied from the main power supply 46 in addition to backing up supply of electric power to the control units 50 and 60 instead of the main power supply 46.

In the aforementioned embodiments, each of the auxiliary power supply control units 72 and 73 may be configured to perform communication with the turning-side control unit 60 via a dedicated signal line. The power state signal Sst may be input to the steering-side control unit 50 via the turning-side control unit 60. In this case, each of the auxiliary power supply control units 72 and 73 may not be configured to communicate with the steering-side control unit 50 via a dedicated signal line. This is effective when the position at which the auxiliary power supply device 70 is provided is set to be closer to the turning unit 6 between the steering unit 4 and the turning unit 6 in the steering system 1.

In the aforementioned embodiments, a control unit having a function in which the function of the steering-side control unit 50 operating the steering-side motor 13 and the function of the turning-side control unit 60 operating the turning-side motor 32 are integrated may be provided in the steering control device 2.

In the aforementioned embodiments, the target reaction torque calculating unit 52a may use at least a state variable that varies depending on the operating state of the steering wheel 3 when calculating the target reaction torque TT*. In this case, the target reaction torque calculating unit 52a may not use the vehicle speed V or the steering torque Th or may use the vehicle speed V and/or the steering torque Th in combination with another factor.

In the aforementioned embodiments, the steering-side control unit 50 may calculate, as the target reaction torque TT*, a value calculated by performing torque feedback control for causing the steering torque Th to conform to the target steering torque calculated based on the steering torque Th.

In the aforementioned embodiments, the steering angle calculating unit 51 may calculate the steering angle θs by considering an amount of torsion of the steering shaft 11 based on the steering torque Th and adding or subtracting the amount of torsion to or from the rotation angle θa.

In the aforementioned embodiments, a result of detection from a steering sensor that is provided in the steering shaft 11 to detect the rotation angle of the steering shaft 11 may be used as the steering angle θs.

In the aforementioned embodiments, it is possible to employ, for example, a configuration in which the turning-side motor 32 is disposed coaxially with the rack shaft 22 or a configuration in which the turning-side motor 32 is connected to the pinion shaft via a worm and wheel, the pinion shaft constituting the rack and pinion mechanism together with the rack shaft 22.

In the aforementioned embodiments, the steering control device 2 can be configured as a processing circuit including (1) one or more processors that operate in accordance with a computer program (software), (2) one or more dedicated hardware circuits such as application-specific integrated circuits (ASIC) that perform at least some of various processes, or (3) a combination thereof. The processor includes a CPU and memories such as a RAM and a ROM, and the memories store program codes or commands configured to cause the CPU to perform processing. Memories, that is, non-transitory computer-readable media, include all available media that can be accessed by a general-purpose or dedicated computer.

In the aforementioned embodiments, the turning unit 6 of the steering system 1 may have an independent turning structure in which the right and left turning wheels 5 can be independently turned. Technical ideas that can be understood from the aforementioned embodiments and the other embodiments may be added below.

(A) The state determining unit may be configured to determine the state of a driver in additional consideration of a state of an occupant other than the driver. For example, in the first power-off period, there is a possibility that an occupant other than the driver left in the cabin may contact the steering wheel when the driver is away from the vehicle but the occupant is left in the cabin. In this regard, with this configuration, since the state of an occupant other than the driver is also considered, it is possible to consider a possibility of contact of the occupant other than the driver with the steering wheel.

(B) The state determining unit may be configured to determine the state of an occupant other than a driver based on at least one of i) a seat state of a seat other than the driver's seat on which the driver sits and ii) a detection state of a detection device provided in the cabin to detect presence of an occupant.

What is claimed is:

1. A steering system comprising:
    a steering actuator configured to operate such that a steering reaction force is applied to a steering wheel of a vehicle, using electric power supplied from a first power supply mounted in the vehicle; and
    a turning actuator having a structure in which a power transmission path between the turning actuator and the steering actuator is cut off, the turning actuator being configured to operate such that turning wheels of the vehicle are turned, using the electric power supplied from the first power supply,
    wherein the steering system is configured such that electric power is supplied to the steering actuator and the turning actuator from the first power supply when a power state of the vehicle is an on state and supply of the electric power from the first power supply is cut off when the power state is an off state, and
    wherein the steering system further includes
    a rotation curbing unit configured to operate such that rotation of the steering wheel is curbed in at least a part of a first power-off period from when the power state becomes the off state until when the power state becomes the on state next, as an operating period, and
    a second power supply configured to supply, to the rotation curbing unit, the electric power required for operation of the rotation curbing unit in the operating period, the second power supply being different from the first power supply,
    wherein:
    the operating period is a period in which a driver is located within a predetermined distance from the vehicle in the first power-off period in regard to states of the driver and the vehicle; and
    the rotation curbing unit is configured to operate in the period in which the driver is within the predetermined distance from the vehicle, as the operating period, while the power state is the off state.

2. The steering system according to claim 1, wherein the operating period coincides with the first power-off period in regard to a state of the vehicle.

3. The steering system according to claim 1 further comprising an electronic control unit configured to determine the state of the driver,
    wherein the electronic control unit is configured to determine the state of the driver based on at least one of i) a key position of a vehicle key for permitting use of the vehicle with respect to the vehicle, ii) the key position and a lock state of a vehicle door that is opened and closed when the driver boards the vehicle and when the driver alights from the vehicle, and iii) the key position and an open-closed state of the vehicle door.

4. The steering system according to claim 1, wherein:
    the steering actuator includes a reaction motor configured to generate a motor torque serving as power for applying the steering reaction force to the steering wheel; and
    the rotation curbing unit is the reaction motor.

5. The steering system according to claim 1, wherein the second power supply is configured to back up supply of the electric power to the steering actuator and the turning actuator instead of the first power supply, on condition that the electric power supplied by the first power supply is decreased or cut off while the power state is the on state.

* * * * *